United States Patent [19]

Bissell, Jr. et al.

[11] Patent Number: 4,726,095
[45] Date of Patent: Feb. 23, 1988

[54] BUCKET FISH SCALER

[76] Inventors: Norman L. Bissell, Jr., 1940 W. Atherton Rd., Flint, Mich. 48507; Robert L. Breece, 14289 N. Center Rd., Clio, Mich. 48420; Robert T. Griffiths, 90 Barron Rd., Ortonville, Mich. 48462

[21] Appl. No.: 886,323

[22] Filed: Jul. 17, 1986

[51] Int. Cl.⁴ .......................................... A22C 25/02
[52] U.S. Cl. .................................................. 17/64
[58] Field of Search .............................. 17/64, 65, 67

[56] References Cited

U.S. PATENT DOCUMENTS

| | | |
|---|---|---|
| 71,434 | 11/1867 | White . |
| 91,238 | 6/1869 | Lehman . |
| 100,348 | 3/1870 | Williams . |
| 1,683,968 | 9/1928 | Gallison . |
| 1,775,693 | 9/1930 | Price . |
| 1,886,061 | 11/1932 | Speidel . |
| 2,162,400 | 6/1939 | Heath . |
| 2,274,485 | 2/1942 | Janssen . |
| 2,355,405 | 8/1944 | Vucassovich . |
| 2,364,685 | 12/1944 | Balisteri et al. . |
| 2,701,131 | 2/1955 | Love . |
| 2,860,371 | 11/1958 | Krull . |
| 2,966,159 | 12/1960 | Ruegnitz . |
| 3,154,123 | 10/1964 | Tomlinson . |
| 3,304,574 | 2/1967 | Ham et al. ............... 17/64 |
| 3,321,188 | 5/1967 | Unger . |
| 3,411,756 | 11/1968 | Ziegler . |
| 4,485,526 | 12/1984 | Opanasenko . |

FOREIGN PATENT DOCUMENTS

| | | |
|---|---|---|
| 437620 | 11/1926 | Fed. Rep. of Germany .......... 17/64 |
| 469506 | 12/1928 | Fed. Rep. of Germany .......... 17/65 |
| 605823 | 2/1926 | France ....................... 17/64 |
| 8996 | of 1900 | United Kingdom ............. 17/64 |
| 839464 | 6/1981 | U.S.S.R. ..................... 17/64 |

*Primary Examiner*—Willie G. Abercrombie
*Attorney, Agent, or Firm*—Price, Heneveld, Cooper, DeWitt & Litton

[57] ABSTRACT

The specification discloses a portable fish scaling device which is simple and easily used and cleaned. The device includes a water-tight bucket, an abrasive continuous surface within the bucket, and an agitator for agitating water within the bucket. As the water is agitated, fish suspended within the water gently tumble against the abrasive surface and are thereby scaled. Preferably, the abrasive surface is an inwardly dimpled bucket liner; and the agitator is a rotatable impeller.

12 Claims, 6 Drawing Figures

U.S. Patent    Feb. 23, 1988    4,726,095
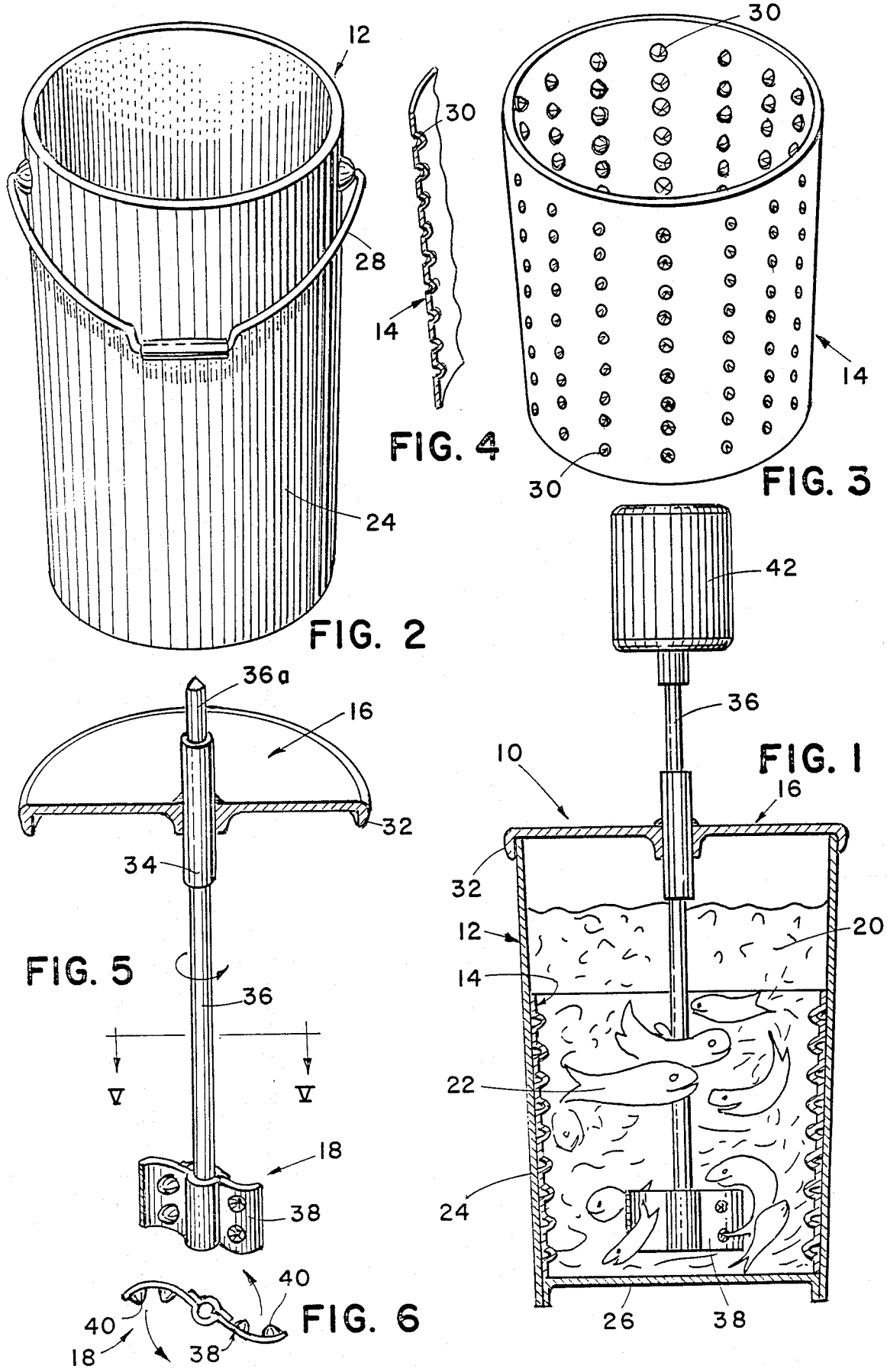

BUCKET FISH SCALER

BACKGROUND OF THE INVENTION

The present invention relates to fish scaling devices, and more particularly to such devices capable of batch processing quantities of fish.

As an essential step in the fish-cleaning process, the fish must be scaled. A variety of devices have been developed for batch processing fish during scaling. However, these apparatuses are not without their drawbacks.

Perhaps the most common scaling apparatus includes a generally cylindrical chamber having an abrasive interior wall rotated about a substantially horizontal axis. Fish are tumbled within the rotating chamber to be scaled by the abrasive surface. Examples of such devices are illustrated in U.S. Pat. Nos. 4,485,526, issued Dec. 4, 1984, to Opanasenko, entitled FISH SCALING APPARATUS; 2,355,405 issued Aug. 8, 1944, to Vucassovich, entitled METHOD AND APPARATUS FOR REMOVING SCALES FROM FISH; 1,775,693, issued Sept. 16, 1930, to Price, entitled FISH SCALING MACHINE; 1,683,968, issued Sept. 11, 1928, to Gallison, entitled MACHINE FOR REMOVING SCALES FROM FISH; and 71,434, issued Nov. 26, 1867, to White, entitled IMPROVED MACHINE FOR SCALING FISH. These machines are typically commercial units and are rather large and bulky. Consequently, these devices are not readily usable by the hobbyist fisherman who wishes to simply scale a string or bucketful of fish. Second, these scalers can damage the fish, which are gravity tumbled much like the clothes with a household clothes dryer. Tumbling damage can adversely affect both the visual appearance of the fish and the quality of the fish meat.

Another batch fish-scaling machine is illustrated in U.S. Pat. No. 2,860,371, issued Nov. 18, 1958 to Krull, entitled FISH CLEANING DEVICE, which includes a chamber having a fixed cylindrical sidewall and a rotatable abrasive floor. The rotating floor gravity tumbles the fish and removes the scales therefrom. The Krull device is not readily adaptable for use by hobbyist fisherman. Further, this device also can damage the fish as they tumble on the abrasive floor.

SUMMARY OF THE INVENTION

The aforementioned problems are overcome in the present invention wherein a fish scaling device is provided for gently yet efficiently scaling fish in a construction readily transported and utilized by the hobbyist fisherman. More specifically, the apparatus includes a water-tight bucket, a cylindrical abrasive surface within the bucket, and an agitator for stirring water within the bucket. The fish to be scaled are placed in the bucket, and the bucket is filled with water to a height above the fish to suspend the fish. The impeller is actuated to swirl the water and bring the fish into contact with the abrasive surface to scale the fish. The fish, being suspended in water, are gently tumbled against the abrasive surface so that the fish are not damaged. The construction is readily transportable and usable by hobbyist fisherman to clean a string of fish in a single batch operation.

Preferably, the abrasive surface is a cylindrical liner closely received within the bucket. Alternatively, the abrasive surface can be incorporated into the bucket wall itself. Further preferably, the agitator includes a rotatable impeller for imparting a swirling motion to the water within the bucket. Even further preferably, the agitator is vertically reciprocable within the bucket to permit even further improved agitation.

These and other objects, advantages, and features of the invention will be more fully understood and appreciated by reference to the detailed description of the preferred embodiment and the drawings.

BRIEF DESCRIPTION OF THE DRAWINGS

FIG. 1 is a sectional view through the bucket fish scaler of the present invention;

FIG. 2 is a perspective view of the bucket;

FIG. 3 is a perspective view of the abrasive liner;

FIG. 4 is a fragmentary perspective view, partially in section, of the liner;

FIG. 5 is a fragmentary perspective view, partially in section, of the lid and agitator; and FIG. 6 is a top plan view of the agitator impeller.

DETAILED DESCRIPTION OF THE PREFERRED EMBODIMENT

A bucket fish scaler constructed in accordance with a preferred aspect of the invention is illustrated in FIG. 1 and generally designated 10. The scaler includes a bucket 12 (FIG. 2) a liner 14 (FIGS. 3 and 4) a cover 16 (FIG. 5), and an impeller assembly 18 (FIGS. 5 and 6). An abrasive surface is provided by the liner, which is dimpled inwardly and fitted closely within the bucket 12. The cover 16 supports the impeller assembly 18 for both rotatable and vertically reciprocable motion. To scale fish, the liner 14 is positioned in the bucket 12; and the fish 22 are placed in the bucket. The bucket is filled with water 20 to a height about 7 inches above the fish to suspend the fish. The cover 16 is then secured to the top of the bucket; and the impeller assembly 18 is rotated to swirl the water and gently tumble the fish against the liner for scaling.

The bucket 12 (FIGS. 1-2) is a conventional metal or plastic bucket including a cylindrical, slightly frustoconical sidewall 24 and a floor 26. The floor can be integrally molded with the sidewall, or joined thereto for example by stamping or welding. In the preferred embodiment the bucket is about 16 inches high, 11 inches in diameter at its upper open end, and 10 inches in diameter at its lower closed end. Preferably, the bucket includes a handle 28 to facilitate transportation of the scaling apparatus.

The liner 14 (FIGS. 1 and 3-4) is also slightly frustoconical to be closely received within the bucket. Preferably, the liner is fabricated of stainless steel to facilitate cleaning. Other materials, such as other metals and/or plastic could also be used. A plurality of pimples or dimples 30 are formed on the inner surface of the liner 14 to render the interior surface abrasive. The pimples can be formed for example by deforming the liner inwardly or piercing the liner with a sharp object. Preferably, the pimples extend the full circumference and height of the cylinder 14. Consequently, the liner 14 provides a continuous abrasive surface. As an alternative, the abrasive surface could be integrally formed or molded in the bucket 12.

The lid 16 (FIGS. 1 and 5-6) is generally planar and includes a depending lip 32 which is configured to snap-fit onto the upper open end of the bucket 12. Other suitable attachment means could be provided such as latches. An elongated guide tube 34 extends through the center of the lid 16 and is fixedly secured therein. If the lid is plastic, the guide tube can be integrally molded with the remainder of the lid. If the lid is metal, the guide tube can be welded within the lid.

The impeller assembly 18 (FIGS. 1 and 5-6) includes a rod 36 and in impeller 38 fixedly secured to the lower end thereof. The rod 36 is closely received within the guide tube 34 and is both rotatable and vertically reciprocable therein. The impeller 38 is S-shaped (see in particular FIG. 6) and also includes dimples 40 formed therein. The impeller 38 is fixedly secured to the lower end of the rod 36 for rotation therewith. In the preferred embodiment, the rod is ⅜ inch rod about 16 inches long. Preferably (FIG. 5), the upper end 36a of the rod 36 is configured to be received within the chuck of a conventional hand-held power tool, such as an electric drill. Alternatively (FIG. 1), an electric motor 42 can be mounted on the upper end of the rod 36. The motor can be either 110 volts or 12 volts to be powered by a vehicle battery.

Operation

The fish scaler 10 gently yet efficiently removes scales from fish. The device is prepared for scaling by placing the liner 14 in the bucket 12 and resting on the bucket floor 26. The fish 22 to be scaled are placed in the bucket, and the bucket is filled with water to suspend the fish. The cover 16 is then secured on top of the bucket 12 with the impeller 38 extending into the water 20. In the embodiment shown in FIG. 5, a power tool must be connected to the upper end of the shaft 36. Using either the power tool or the motor 42, the impeller shaft 36 is rotated to drive the impeller 38. The impeller 38 imparts a swirling motion to the water 20 and fish 22 suspended therein to gently tumble and scale the fish against the abrasive liner 14. Preferably, the fish are inspected approximately every 30 seconds to evaluate scaling, so that the fish are not damaged by excessive agitation. After scaling is complete, the fish 22 and water 20 are removed from the bucket. The liner 14 can also be removed from the bucket 12 enabling the entire device 10 to be easily hosed-off or otherwise cleaned.

The above description is that of a preferred embodiment of the invention. Various alterations and changes can be made without departing from the spirit and broader aspects of the invention as set forth in the appended claims, which are to be interpreted in accordance with the principles of patent law including the doctrine of equivalents.

The embodiments of the invention in which an exclusive property or privilege is claimed are defined as follows:

1. A fish scaling apparatus comprising:
    a cylindrical water-tight bucket for containing water enabling fish to be suspended therein, said bucket having an upper end;
    a removable cylindrical liner fitted closely within said bucket, said liner providing an abrasive surface within said bucket;
    a lid for covering said open end of said bucket, said lid defining an aperture;
    a rotatable agitator including a rod extending through said lid aperture and being rotatable therein and an impeller fixedly secured to said rod below said lid.

2. A fish scaling apparatus as defined in claim 1 wherein said lid includes an elongated guide tube defining said aperture to improve the support of said rod within said lid.

3. A fish scaling apparatus as defined in claim 1 wherein said liner is pimpled inwardly to provide said abrasive surface.

4. A fish scaling apparatus as defined in claim 1 wherein said rod includes an upper end configured to fit within the chuck of a conventional power tool, whereby said agitator can be rotated by the power tool.

5. A fish scaling apparatus as defined in claim 1 further comprising means for releasably securing said lid on said bucket.

6. A fish scaling apparatus comprising:
    container means for containing water enabling fish to be suspended therein, said container means including abrasive means for providing a continuous substantially vertical abrasive surface within said container means;
    cover means for covering said container means, said cover means including a guide tube fixedly supported therein; and
    agitator means within said container means for agitating water within said container means, said agitator means including a rotatable impeller and a rod supporting said impeller, said rod being rotatably and reciprocably supported within said guide tube, whereby fish can be scaled by placing the fish and water in said container means and agitating the water to gently tumble the suspended fish against said abrasive surface.

7. A fish scaling apparatus as defined in claim 6 wherein the upper end of said rod is configured to fit within the chuck of a conventional power tool.

8. A fish scaling apparatus as defined in claim 6 wherein said cover means includes means for releasably securing said cover means on said container means.

9. A fish scaling apparatus as defined in claim 6 wherein said abrasive means is removable from said container means to facilitate cleaning of said apparatus.

10. A fish scaling apparatus as defined in claim 6 wherein said continuous surface is pimpled inwardly to render same abrasive.

11. A fish scaling apparatus as defined in claim 1 wherein said rod is vertically reciprocable within said lid aperture.

12. A fish scaling apparatus as defined in claim 6 wherein said agitator means includes means for vertically reciprocating said impeller within said container means.

* * * * *